Dec. 24, 1940.   G. E. BULLOCK   2,226,424
PEDAL CONSTRUCTION
Original Filed June 16, 1937

INVENTOR.
Giles E. Bullock
BY
ATTORNEY

Patented Dec. 24, 1940

2,226,424

UNITED STATES PATENT OFFICE 2,226,424

PEDAL CONSTRUCTION

Giles E. Bullock, Rochester, N. Y.

Original application June 16, 1937, Serial No. 148,525. Divided and this application May 8, 1940, Serial No. 334,018

5 Claims. (Cl. 74—594.4)

This invention relates to pedal constructions for use in bicycles, velocipedes and other crank operated vehicles and the principal object of this invention is to provide a novel, simplified and inexpensive crank and pedal construction which embodies extremely efficient wearing qualities.

This and other objects and attendant advantages of this invention will become more readily apparent from the detailed description thereof which follows, reference being had to the accompanying drawing in which Figure 1 is a side elevation of the bearing of the novel pedal construction.

Figure 1:
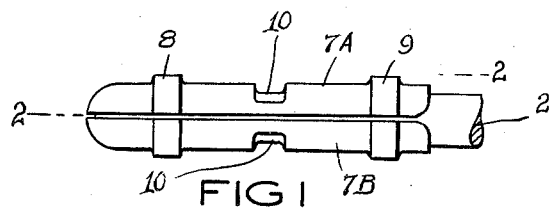
Figure 2:
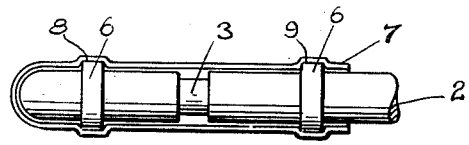
Figure 2 is a longitudinal sectional view of the bearing taken on the line 2—2 in Figure 1.
Figure 3:
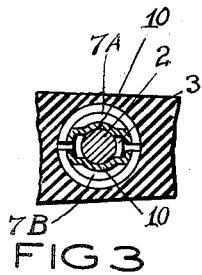
Figure 3 is a cross section of the pedal structure taken on the line 3—3 in Figures 4 and 6.
Figure 4:
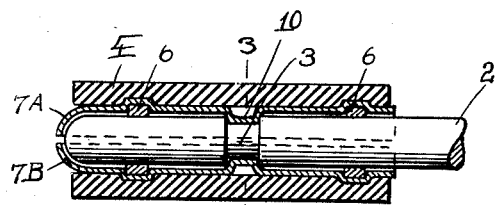
Figure 4 is a longitudinal sectional view of the pedal structure taken on the line 4—4 in Figure 5.
Figure 5:
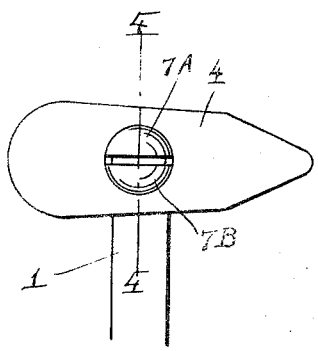
Figure 5 is an end view of the pedal structure and crank.
Figure 6:
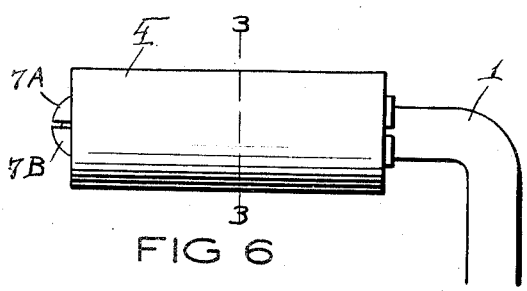
Figure 6 is a side elevation of the pedal structure and crank.

This application is a division of my prior application Serial No. 148,525 filed June 16, 1937. The pedal construction, forming the subject matter of the present invention, is combined with the structure of a crank 1 in which the crank pin 2 is provided with an annular locking groove 3 intermediate the ends thereof. The pedal proper comprises a suitable rubber body 4 with an expansible hole 5 extending therethru from one end to the other.

The bearing for the pedal, which enables it to freely rotate on the crank pin 1, comprises a pair of "oilless" bearing rings 6, 6 which encircle the crank pins and are spacedly held apart thereon by means of the retaining bushing 7. The latter comprises a cylindrical sheet metal housing which is longitudinally divided into two like sections 7A and 7B. The housing is formed so that each section is provided with a pair of substantially semi-circular channels 8 and 9 which are spaced so that the opposing semi-circular channels of each section form continuations of each other and are adapted to embrace and hold one of the oilless bearing rings in place between them. The two bearing rings are thus spacedly locked in the sheet metal housing to provide an efficient bearing support for the pedal on the crank pin 2.

To lock the retaining housing with the bearing rings to the crank pin 2, each of the sections 7A and 7B of the housing is provided with a semi-circular inwardly projecting ridge 10 which is adapted to engage into the annular groove 3 in the crank pin 2 to keep the housing with its bearing rings against endwise movement on the crank pin 2.

The two sections 7A and 7B of the housing 7 are held together and in place on the crank pin 2 by the pedal body 4 which is telescoped over the housing to have the yielding wall of the expansible hole 5 of the pedal tightly embrace and hold the sections of the housing together and substantially embedded in the rubber body of the pedal.

In this way the pedal body 4, its bushing 7, the two self lubricating bearing rings 6, 6 and the crank pin 2 are interlocked with each other so that the assembly of the pedal on the crank automatically locks the pedal for efficient rotation on the crank pin without the aid of additional locking and mounting means. The outer end of each of the sections 7A and 7B of the bushing are rounded in order to extend over and cover the end of the crank pin 2.

I claim:

1. A pedal for a crank comprising a pair of substantially semi-cylindrical sleeve sections, bearing rings held spaced in said sleeve sections and means surrounding said semi-cylindrical sleeve sections to hold said sleeve sections against said bearing rings for rotation on said crank.

2. A pedal for a crank comprising a pair of substantially semi-cylindrical sleeve sections, a semi-cylindrical groove on the inside of said sleeve sections opposite to each other, a bearing ring surrounding said crank and engaging into said grooves of said sleeve sections so as to be held against endwise movement therein, an annular groove in said crank, means carried by one of said sleeve sections for engagement into said annular groove so as to hold said sleeve section against endwise movement on said crank and means encircling said sleeve sections so as to hold said bearing ring between them for rotation on said crank and hold said sleeve section in engagement into said annular groove.

3. The combination in a pedal for cranks as set forth in claim 2 in which the means encircling said sleeve sections comprise a resilient rubber pedal member having an expansible hole therethru.

4. In a crank and pedal construction, the combination of an annular groove around said crank, a pair of substantially semi-cylindrical sleeve members surrounding said crank, a pair of semi-annular uniformly spaced grooves in said sleeve members, a bearing ring held between opposing semi-annular grooves of said sleeve sections, lugs struck inwardly of said sleeve sections so as to engage into the annular groove in said crank and a rubber pedal yieldingly surrounding said sleeve sections to hold said sleeve sections together with the bearing rings between them and hold the lugs of said sleeve sections in engagement with said crank to hold said sleeve sections against endwise movement on said crank.

5. A pedal for a crank comprising a pair of substantially semi-cylindrical sleeve sections, bearing means provided in said sleeve sections for rotative support of said sleeve sections on said crank, and a hollow rubber pedal member telescopingly surrounding and yieldingly connecting said semi-cylindrical sleeve sections.

GILES E. BULLOCK.